15

US008756612B2

(12) United States Patent
Archer et al.

(10) Patent No.: US 8,756,612 B2
(45) Date of Patent: *Jun. 17, 2014

(54) SEND-SIDE MATCHING OF DATA COMMUNICATIONS MESSAGES

(71) Applicant: International Business Machines Corportion, Armonk, NY (US)

(72) Inventors: Charles J. Archer, Rochester, MN (US); Michael A. Blocksome, Rochester, MN (US); Joseph D. Ratterman, Seattle, WA (US); Brian E. Smith, Knoxville, TN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,790

(22) Filed: Nov. 2, 2012

(65) Prior Publication Data

US 2013/0073603 A1 Mar. 21, 2013

Related U.S. Application Data

(63) Continuation of application No. 12/881,863, filed on Sep. 14, 2010.

(51) Int. Cl.
*G06F 13/00* (2006.01)
*G06F 15/16* (2006.01)
*G06F 9/54* (2006.01)
*G06F 9/46* (2006.01)
*G06F 9/52* (2006.01)

(52) U.S. Cl.
CPC . *G06F 9/546* (2013.01); *G06F 9/46* (2013.01); *G06F 9/52* (2013.01)
USPC ............ 719/313; 709/201; 709/248; 718/102

(58) Field of Classification Search
CPC ............... G06F 9/46; G06F 9/52; G06F 9/54; G06F 9/546

USPC ......... 709/212–216, 216–219, 201–206, 208, 709/248; 719/313–317; 712/28–31; 718/100, 102–108

See application file for complete search history.

(56) References Cited

U.S. PATENT DOCUMENTS 4,715,032 A 12/1987 Nilsson
4,843,540 A 6/1989 Stolfo (Continued)

FOREIGN PATENT DOCUMENTS

EP 1835414 A2 9/2007
JP 2000156039 A 6/2000

(Continued)

OTHER PUBLICATIONS

Foster, Ian, William Gropp, and Carl Kesselman. "Message passing and threads." Sourcebook of parallel computing. Morgan Kaufmann Publishers Inc., 2003.*

(Continued)

*Primary Examiner* — Patrice Winder
*Assistant Examiner* — Julian Chang
(74) *Attorney, Agent, or Firm* — Biggers Kennedy Lenart Spraggins LLP

(57) ABSTRACT

Send-side matching of data communications messages in a distributed computing system comprising a plurality of compute nodes, including: issuing by a receiving node to source nodes a receive message that specifies receipt of a single message to be sent from any source node, the receive message including message matching information, a specification of a hardware-level mutual exclusion device, and an identification of a receive buffer; matching by two or more of the source nodes the receive message with pending send messages in the two or more source nodes; operating by one of the source nodes having a matching send message the mutual exclusion device, excluding messages from other source nodes with matching send messages and identifying to the receiving node the source node operating the mutual exclusion device; and sending to the receiving node from the source node operating the mutual exclusion device a matched pending message.

5 Claims, 9 Drawing Sheets

(56) References Cited

U.S. PATENT DOCUMENTS

| | | | |
|---|---|---|---|
| 5,101,480 A | 3/1992 | Shin et al. | |
| 5,105,424 A | 4/1992 | Flaig et al. | |
| 5,333,279 A | 7/1994 | Dunning | |
| 5,377,333 A | 12/1994 | Nakagoshi et al. | |
| 5,513,371 A | 4/1996 | Cypher et al. | |
| 5,541,914 A | 7/1996 | Krishnamoorthy et al. | |
| 5,590,334 A * | 12/1996 | Saulpaugh et al. | 719/315 |
| 5,617,538 A | 4/1997 | Heller | |
| 5,668,815 A | 9/1997 | Gittinger et al. | |
| 5,721,828 A | 2/1998 | Frisch | |
| 5,822,604 A | 10/1998 | Ogasawara et al. | |
| 5,822,605 A | 10/1998 | Higuchi et al. | |
| 5,826,049 A | 10/1998 | Ogata et al. | |
| 5,832,215 A | 11/1998 | Kato et al. | |
| 5,864,712 A | 1/1999 | Carmichael et al. | |
| 5,875,329 A * | 2/1999 | Shan | 719/314 |
| 5,878,241 A | 3/1999 | Wilkinson et al. | |
| 5,892,923 A | 4/1999 | Yasuda et al. | |
| 5,937,202 A | 8/1999 | Crosetto et al. | |
| 5,949,988 A | 9/1999 | Feisullin et al. | |
| 5,958,017 A | 9/1999 | Scott et al. | |
| 6,000,024 A | 12/1999 | Maddox et al. | |
| 6,038,651 A | 3/2000 | VanHuben et al. | |
| 6,067,609 A | 5/2000 | Meeker et al. | |
| 6,076,131 A | 6/2000 | Nugent | |
| 6,108,692 A | 8/2000 | Van Seters et al. | |
| 6,212,617 B1 | 4/2001 | Hardwick | |
| 6,272,548 B1 | 8/2001 | Cotter et al. | |
| 6,289,424 B1 | 9/2001 | Stevens | |
| 6,292,822 B1 | 9/2001 | Hardwick | |
| 6,334,138 B1 | 12/2001 | Kureya | |
| 6,473,849 B1 * | 10/2002 | Keller et al. | 712/30 |
| 6,480,885 B1 | 11/2002 | Olivier | |
| 6,647,438 B1 | 11/2003 | Connor et al. | |
| 6,691,101 B2 | 2/2004 | MacNicol et al. | |
| 6,714,552 B1 | 3/2004 | Cotter | |
| 6,742,063 B1 | 5/2004 | Hellum et al. | |
| 6,754,211 B1 | 6/2004 | Brown | |
| 6,834,301 B1 | 12/2004 | Hanchett | |
| 6,914,606 B2 | 7/2005 | Amemiya et al. | |
| 6,954,806 B2 | 10/2005 | Yosimoto et al. | |
| 6,982,960 B2 | 1/2006 | Lee et al. | |
| 7,010,576 B2 | 3/2006 | Bae | |
| 7,073,043 B2 | 7/2006 | Arimilli et al. | |
| 7,133,359 B2 | 11/2006 | Weis | |
| 7,143,392 B2 | 11/2006 | Ii et al. | |
| 7,171,484 B1 | 1/2007 | Krause et al. | |
| 7,203,743 B2 | 4/2007 | Shah-Heydari | |
| 7,263,598 B2 | 8/2007 | Ambuel | |
| 7,263,698 B2 | 8/2007 | Wildhagen et al. | |
| 7,284,033 B2 | 10/2007 | Jhani | |
| 7,352,739 B1 | 4/2008 | Rangarajan et al. | |
| 7,363,474 B2 | 4/2008 | Rodgers et al. | |
| 7,487,501 B2 | 2/2009 | Silvera et al. | |
| 7,496,699 B2 | 2/2009 | Pope et al. | |
| 7,509,244 B1 | 3/2009 | Shakeri et al. | |
| 7,539,989 B2 | 5/2009 | Blackmore et al. | |
| 7,555,566 B2 | 6/2009 | Blumrich et al. | |
| 7,571,439 B1 * | 8/2009 | Rabinovici et al. | 718/104 |
| 7,587,516 B2 | 9/2009 | Bhanot et al. | |
| 7,590,983 B2 | 9/2009 | Neiman et al. | |
| 7,600,095 B2 | 10/2009 | Archer et al. | |
| 7,613,134 B2 | 11/2009 | Rangarajan et al. | |
| 7,640,315 B1 * | 12/2009 | Meyer et al. | 709/210 |
| 7,664,110 B1 | 2/2010 | Lovett et al. | |
| 7,673,011 B2 | 3/2010 | Archer et al. | |
| 7,697,443 B2 | 4/2010 | Archer et al. | |
| 7,707,366 B2 | 4/2010 | Tagawa | |
| 7,725,329 B2 | 5/2010 | Kil et al. | |
| 7,739,451 B1 | 6/2010 | Wiedenman et al. | |
| 7,774,448 B2 | 8/2010 | Shah-Heydari | |
| 7,796,527 B2 | 9/2010 | Archer et al. | |
| 7,808,930 B2 | 10/2010 | Boers et al. | |
| 7,835,378 B2 | 11/2010 | Wijnands et al. | |
| 7,936,681 B2 | 5/2011 | Gong et al. | |
| 7,948,999 B2 | 5/2011 | Blocksome et al. | |
| 7,974,221 B2 | 7/2011 | Tamassia et al. | |
| 7,984,448 B2 | 7/2011 | Almasi et al. | |
| 7,991,857 B2 | 8/2011 | Berg et al. | |
| 8,090,797 B2 | 1/2012 | Chinta et al. | |
| 8,131,825 B2 | 3/2012 | Nord et al. | |
| 8,136,104 B2 | 3/2012 | Papakipos et al. | |
| 8,161,268 B2 | 4/2012 | Faraj | |
| 8,161,480 B2 | 4/2012 | Archer et al. | |
| 8,326,943 B2 | 12/2012 | Chinta et al. | |
| 8,365,186 B2 | 1/2013 | Faraj et al. | |
| 8,436,720 B2 | 5/2013 | Archer et al. | |
| 8,565,089 B2 | 10/2013 | Archer et al. | |
| 2002/0016901 A1 | 2/2002 | Carvey et al. | |
| 2002/0054051 A1 | 5/2002 | Ladd | |
| 2002/0091819 A1 | 7/2002 | Melchione et al. | |
| 2002/0144027 A1 | 10/2002 | Schmisseur | |
| 2003/0041173 A1 * | 2/2003 | Hoyle | 709/248 |
| 2003/0182376 A1 | 9/2003 | Smith | |
| 2003/0188054 A1 | 10/2003 | Yosimoto et al. | |
| 2003/0212877 A1 | 11/2003 | Dally et al. | |
| 2003/0225852 A1 | 12/2003 | Bae | |
| 2004/0034678 A1 | 2/2004 | Kuszmaul et al. | |
| 2004/0073590 A1 | 4/2004 | Bhanot et al. | |
| 2005/0094577 A1 | 5/2005 | Ashwood-Smith | |
| 2005/0135395 A1 | 6/2005 | Fan et al. | |
| 2005/0165980 A1 | 7/2005 | Clayton et al. | |
| 2005/0243711 A1 | 11/2005 | Alicherry et al. | |
| 2006/0156312 A1 * | 7/2006 | Supalov | 719/314 |
| 2006/0168359 A1 | 7/2006 | Bissessur et al. | |
| 2006/0179181 A1 | 8/2006 | Seong | |
| 2006/0182137 A1 * | 8/2006 | Zhou et al. | 370/428 |
| 2006/0277323 A1 | 12/2006 | Joublin et al. | |
| 2006/0282838 A1 | 12/2006 | Gupta et al. | |
| 2007/0110063 A1 | 5/2007 | Tang et al. | |
| 2007/0174558 A1 | 7/2007 | Jia et al. | |
| 2007/0226686 A1 * | 9/2007 | Beardslee et al. | 717/109 |
| 2007/0242611 A1 | 10/2007 | Archer et al. | |
| 2007/0245122 A1 | 10/2007 | Archer et al. | |
| 2007/0288935 A1 | 12/2007 | Tannenbaum et al. | |
| 2007/0294666 A1 | 12/2007 | Papakipos et al. | |
| 2007/0294681 A1 | 12/2007 | Tuck et al. | |
| 2008/0022079 A1 | 1/2008 | Archer et al. | |
| 2008/0077366 A1 | 3/2008 | Neuse et al. | |
| 2008/0109569 A1 | 5/2008 | Leonard et al. | |
| 2008/0201603 A1 | 8/2008 | Ritz et al. | |
| 2008/0250325 A1 | 10/2008 | Feigenbaum et al. | |
| 2008/0263320 A1 | 10/2008 | Archer et al. | |
| 2008/0263329 A1 | 10/2008 | Archer et al. | |
| 2008/0273543 A1 | 11/2008 | Blocksome et al. | |
| 2008/0288949 A1 * | 11/2008 | Bohra et al. | 718/104 |
| 2008/0301683 A1 | 12/2008 | Archer et al. | |
| 2009/0006662 A1 | 1/2009 | Chen et al. | |
| 2009/0006663 A1 | 1/2009 | Archer et al. | |
| 2009/0019218 A1 | 1/2009 | Sinclair et al. | |
| 2009/0019258 A1 * | 1/2009 | Shi | 712/29 |
| 2009/0037377 A1 | 2/2009 | Archer et al. | |
| 2009/0037511 A1 | 2/2009 | Almasi et al. | |
| 2009/0037707 A1 | 2/2009 | Blocksome | |
| 2009/0040946 A1 | 2/2009 | Archer et al. | |
| 2009/0043910 A1 | 2/2009 | Barsness et al. | |
| 2009/0052462 A1 | 2/2009 | Archer et al. | |
| 2009/0055474 A1 | 2/2009 | Archer et al. | |
| 2009/0064140 A1 | 3/2009 | Arimilli et al. | |
| 2009/0064176 A1 | 3/2009 | Ohly et al. | |
| 2009/0067334 A1 | 3/2009 | Archer et al. | |
| 2009/0154486 A1 | 6/2009 | Archer et al. | |
| 2009/0196361 A1 | 8/2009 | Chan et al. | |
| 2009/0240838 A1 | 9/2009 | Berg et al. | |
| 2009/0240915 A1 | 9/2009 | Faraj | |
| 2009/0245134 A1 | 10/2009 | Archer et al. | |
| 2009/0248712 A1 | 10/2009 | Yuan | |
| 2009/0259713 A1 | 10/2009 | Blumrich et al. | |
| 2009/0292905 A1 | 11/2009 | Faraj | |
| 2009/0307467 A1 | 12/2009 | Faraj | |
| 2009/0310544 A1 | 12/2009 | Jain et al. | |
| 2009/0319621 A1 | 12/2009 | Barsness et al. | |
| 2010/0017420 A1 | 1/2010 | Archer et al. | |
| 2010/0023631 A1 * | 1/2010 | Archer et al. | 709/230 |

(56) References Cited

U.S. PATENT DOCUMENTS

| | | | |
|---|---|---|---|
| 2010/0082788 A1* | 4/2010 | Mundy | 709/223 |
| 2010/0122268 A1 | 5/2010 | Jia | |
| 2010/0191911 A1 | 7/2010 | Heddes et al. | |
| 2010/0274997 A1 | 10/2010 | Archer et al. | |
| 2011/0010471 A1 | 1/2011 | Heidelberger et al. | |
| 2011/0119673 A1 | 5/2011 | Bloch et al. | |
| 2011/0125974 A1* | 5/2011 | Anderson | 711/153 |
| 2011/0153908 A1 | 6/2011 | Schaefer et al. | |
| 2011/0179134 A1 | 7/2011 | Mayo et al. | |
| 2011/0238950 A1 | 9/2011 | Archer et al. | |
| 2011/0258245 A1 | 10/2011 | Blocksome et al. | |
| 2011/0258627 A1 | 10/2011 | Faraj et al. | |
| 2011/0267197 A1 | 11/2011 | Archer et al. | |
| 2011/0270986 A1 | 11/2011 | Archer et al. | |
| 2011/0289177 A1 | 11/2011 | Archer et al. | |
| 2011/0296137 A1 | 12/2011 | Archer et al. | |
| 2011/0296139 A1 | 12/2011 | Archer et al. | |
| 2012/0066284 A1 | 3/2012 | Archer et al. | |
| 2012/0117361 A1 | 5/2012 | Archer et al. | |
| 2012/0179881 A1 | 7/2012 | Archer et al. | |
| 2012/0197882 A1 | 8/2012 | Jensen | |
| 2012/0216021 A1 | 8/2012 | Archer et al. | |
| 2012/0317399 A1 | 12/2012 | Blocksome et al. | |
| 2013/0042088 A1 | 2/2013 | Archer et al. | |
| 2013/0042245 A1 | 2/2013 | Archer et al. | |
| 2013/0042254 A1 | 2/2013 | Archer et al. | |
| 2013/0067198 A1 | 3/2013 | Archer et al. | |
| 2013/0073832 A1 | 3/2013 | Archer et al. | |
| 2013/0074098 A1 | 3/2013 | Archer et al. | |
| 2013/0080563 A1 | 3/2013 | Archer et al. | |
| 2013/0086358 A1 | 4/2013 | Archer et al. | |
| 2013/0111496 A1 | 5/2013 | Archer et al. | |
| 2013/0173675 A1 | 7/2013 | Archer et al. | |
| 2013/0212145 A1 | 8/2013 | Archer et al. | |
| 2013/0212558 A1 | 8/2013 | Archer et al. | |
| 2013/0212561 A1 | 8/2013 | Archer et al. | |
| 2013/0246533 A1 | 9/2013 | Archer et al. | |
| 2013/0290673 A1 | 10/2013 | Archer et al. | |

FOREIGN PATENT DOCUMENTS

| | | | |
|---|---|---|---|
| JP | 2003317487 A | 11/2003 | |
| WO | WO 2007/057281 A1 | 5/2007 | |

OTHER PUBLICATIONS

Simonsson, Peter. "Implementation of a Distributed Shared Memory using MPI." Chalmers University of Technology and Gotegorg University, 2004.*
"MPI: A Message-Passing Interface Standard Version 2.2," 2009.*
Sunggu Lee; Shin, K.G., "Interleaved all-to-all reliable broadcast on meshes and hypercubes," Parallel and Distributed Systems, IEEE Transactions on, vol. 5, pp. 449-458, May 1994.
Wikipedia. "Depth-First Search" May 5, 2007. http://web.archive.org/web/20070505212029/http://en.wikipedia.org/wiki/Depth-first_Search.
Bruck J., et al. Efficient Algorithms for all-to-all communications in multiportmessage-passing systems, Parallel and Distributed Systems, IEEE Transactions on, vol. 8, Issue: 11, pp. 1143-1156, No. 1997.
U.S. Appl. No. 60/271,124, filed Feb. 24, 2001, pp. 12-13, 27 and 42-43.
Office Action Dated Mar. 4, 2008 in U.S. Appl. No. 11/279,620.
Office Action Dated Sep. 3, 2008 in U.S. Appl. No. 11/279,620.
Office Action Dated Dec. 29, 2008 in U.S. Appl. No. 11/279,620.
Office Action Dated Apr. 3, 2009 in U.S. Appl. No. 11/769,367.
Office Action Dated Dec. 13, 2007 in U.S. Appl. No. 11/459,387.
Office Action Dated Jul. 11, 2008 in U.S. Appl. No. 11/459,387.
Office Action Dated Mar. 18, 2009 in U.S. Appl. No. 11/459,387.
Office Action Dated Feb. 9, 2009 in U.S. Appl. No. 11/737,286.
Sistare, et al.; Optimization of MPI collectives on clusters of large-scale SMP's, Conference on High Performance Networking and Computing, Proceedings of the 1999 ACM/IEEE conference on Supercomputing; 1999.
Tanenbaum, Structured Computer Organization, Second Edition, Prentice-Hall, Inc., 1984.
Rosenberg; Dictionarty of Computers, Information Processing & Telecommunications, Second Edition, John Wiley & Sons, 1987.
Notice of Allowance, U.S. Appl. No. 12/124,745, Mar. 6, 2013.
Final Office Action, U.S. Appl. No. 12/770,286, Jan. 29, 2013.
Final Office Action, U.S. Appl. No. 12/748,594, Mar. 22, 2013.
Notice of Allowance, U.S. Appl. No. 12/790,037, Mar. 15, 2013.
Final Office Action, U.S. Appl. No. 13/459,832, Jan. 4, 2013.
Notice of Allowance, U.S. Appl. No. 13/585,993, Jan. 31, 2013.
Office Action, U.S. Appl. No. 13/672,740, Apr. 2, 2013.
"Swap Two Variables Using XOR", BetterExplained.com (online), URL: http://betterexplained.com/articles/swap-two-variables-using-xor/, accessed Jan. 16, 2007, 11 pages.
Foster, et al., "Message Passing and Threads", Sourcebook of Parallel Computing, 1st Edition, Nov. 2002, Chapter 10, pp. 301-317, Morgan Kaufmann Publishers Inc., USA.
Simonsson, "Implementation of a Distributed Shared Memory using MPI", Thesis, Jan. 2005, 96 pages, Chalmers University of Technology and Goteborg University, Goteborg Sweden.
"MPI: A Message-Passing Interface Standard Version 2.2", Message Passing Interface Forum, Sep. 2009, 647 pages, University of Tennessee, Knoxville.
Office Action, U.S. Appl. No. 12/881,863, Jul. 26, 2013.
Faraj, A., et al. "Automatic Generation and Tuning of MPI Collective Communication Routines", ICS' 05, Jun. 20-22, Boston, MA, USA. pp. 393-402, ACM.
Shrimali, G., et al., "Building Packet Buffers Using Interleaved Memories", (Proc. Sixth Workshop High Performance Switching and Routing (HPSR '05), May 2005, pp. 1-5, IEEE.
Ong, H., et al., "Kernel-level Single System Image for Petascale Computing", SIGOPS Oper. Syst. Rev., Apr. 2006, pp. 50-54, vol. 40, No. 2, ACM, New York, NY, USA.
Foster, I., et al., "Message Passing and Threads," Sourcebook of Parallel Computing, (Month Unknown) 2003, pp. 301-317, Morgan Kaufmann Publishers Inc. URL: http://web.eecs.utk.edu/~dongarra/WEB-PAGES/SPRING-2006/chapter10.pdf.
Simonsson, P., "Implementation of a Distributed Shared Memory using MPI," Chalmers University of Technology and Goteborg University, 2004, Supervised together with Anders Gidenstam, Master's Thesis, Finished Jan. 11, 2005, pp. 1-98, Goteborg, Sweden.
Message Passing Interface Forum,"MPI: A Message-Passing Interface Standard Version 2.2", MPI Specification, Sep. 4, 2009, pp. 1-647, High Performance Computing Center Stuttgart (HLRS).
Vetter, J., et al., "Real-Time Performance Monitoring, Adaptive Control, and Interactive Steering of Computational Grids", International Journal of High Performance Computing Applications Winter 2000, pp. 357-366 (10 Pages), vol. 14, No. 4, Sage Publications, Inc. Thousand Oaks, CA, USA.
Wikipedia, "Cache (computing)—Wikipedia, the free encyclopedia", Cache (computing), Edited by EmausBot, Jul. 22, 2011, Accessed Aug. 10, 2013, 6 Pages.
Wikipedia, "Fuzzy logic—Wikipedia, the free encyclopedia", Fuzzy Logic, Edited by Jeff Silvers, Aug. 1, 2011, Accessed Aug. 10, 2013, 10 Pages.
Wikipedia, "Depth-first search—Wikipedia, the free encyclopedia", http://web.archive.org/web/20070505212029/http://en.wikipedia.org/wiki/Depth-first_search, Apr. 29, 2009, pp. 1-5.
Sistare, S., et al., "Optimization of MPI collectives on clusters of large-scale SMP's", Conference on High Performance Networking and Computing, Proceedings of the 1999 ACM/IEEE Conference on Supercomputing; Nov. 1999, pp. 1-14, ACM, New York, NY, USA.
Tanenbaum, A., "Structured Computer Organization", Jan. 1984, pp. 1-5, Second Edition, Prentice-Hall, Inc., Englewood Cliffs, NJ, USA, ISBN: 0-13-854489-1.
Shaw, D., et al., DADO: A Tree-Structured Machine Architecture for Production Systems, AAAI-82 Proceedings, Jan. 1982, AAAI (www.aaai.org), pp. 242-46, AAAI Press.
Better Explained, "Swap two variables using XOR I BetterExplained", http://betterexplained.com/articles/swap-two-variables-using-xor, Accessed Jun. 4, 2011, pp. 1-8.

(56) References Cited

OTHER PUBLICATIONS

Rosenberg, J., "Dictionary of Computers, Information Processing & Telecommunications", Sep. 1987, pp. 1-5, Second Edition, John Wiley & Sons, New York, NY, USA.

Herbordt, et al., "Computing Parallel Prefix and Reduction Using Coterie Structures", Fourth Symposium on the Frontiers of Massively Parallel Computation, Oct. 1992, pp. 141-149, IEEE Xplore Digital Library, USA.

Fisher, et al., "Computing the Hough Transform on a Scan Line Array Processor [image processing]", IEEE Transactions on Pattern Analysis and Machine Intelligence, vol. 11, Issue: 3, Mar. 1989, pp. 262-265, IEEE Xplore Digital Library, USA.

Matsuda, et al., "Efficient MPI Collective Operations for Clusters in Long-and-Fast Networks", 2006 IEEE International Conference on Cluster Computing, Sep. 2006, pp. 1-09, IEEE Xplore Digital Library, USA.

Oh, "An All-Reduce Operation in Star Networks Using All-to-All Broadcast Communication Patterns", 5th International Conference Computer Science (ICCS 2005), LNCS 3514, May 2005, pp. 419-426, Springer-Verlag Berlin Heidelberg, USA.

Yuan, et al., "Bandwidth Efficient All-reduce Operation on Tree Topologies", 12th IEEE IPDPS Workshop on High-Level Parallel Programming Models and Supportive Environments, Mar. 2007, pp. 1-08, IEEE Computer Society, USA.

Edmonds, et al., "AM++: A Generalized Active Message Framework", The 19th International Conference on Parallel Architectures and Compilation Techniques (PACT'10), Sep. 11-15, 2010, pp. 1-10, ACM, New York, NY USA, ISBN: 978-1-4503-0178-7.

Bangalore et al., "Extending the Message Passing Interface (MPI)", Proceedings of the 1994 Conference on Scalable Parallel Libraries, Oct. 12-14, 1994, pp. 106-118, IEEE Computer Society Press, USA, DOI: 10.1109/SPLC.1994.376998.

Bafna, "Coprocessor Design to Support MPI Primitives in Configurable Multiprocessors", Integration, the VLSI Journal, Apr. 2007, pp. 235-252, vol. 40, Issue 3, Elsevier, USA.

Keller, et al., "MPI Development Tools and Applications for the Grid", In Workshop on Grid Applications and Programming Tools (GGF8), Jun. 2003, pp. 1-12, Seattle, USA.

Tang, "Optimizing threaded MPI execution on SMP clusters", International Conference on Supercomputing, Jun. 2001, pp. 381-392, ACM, New York, NY USA.

\* cited by examiner

US 8,756,612 B2

SEND-SIDE MATCHING OF DATA COMMUNICATIONS MESSAGES

CROSS-REFERENCE TO RELATED APPLICATION

This application is a continuation application of and claims priority from U.S. patent application Ser. No. 12/881,863, filed on Sep. 14, 2010.

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for send-side matching of data communications messages in a distributed computing system comprising a plurality of compute nodes organized for collective operations.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Collective operations that involve data communications amongst many compute nodes may be carried out with a variety of algorithms. That is, the end result of a collective operation may be achieved in various ways. Some algorithms may provide better performance than other algorithms when operating in particular configurations. What is needed therefore is a way to optimize the selection of the best performing algorithm or set of algorithms to carry out collective operations in particular operating configurations.

SUMMARY OF THE INVENTION

Methods, apparatus, and products for send-side matching of data communications messages in a distributed computing system comprising a plurality of compute nodes organized for collective operations are disclosed that include: issuing by a receiving node to a plurality of source nodes a receive message that specifies receipt of a single message to be sent from any source node, the receive message also including message matching information, a specification of a hardware-level mutual exclusion device, and an identification of a receive buffer; matching by two or more of the source nodes the receive message with pending send messages in the two or more source nodes; operating by one of the source nodes having a matching send message the mutual exclusion device, excluding messages from other source nodes with matching send messages and identifying to the receiving node the source node operating the mutual exclusion device; and sending to the receiving node from the source node operating the mutual exclusion device a matched pending message.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
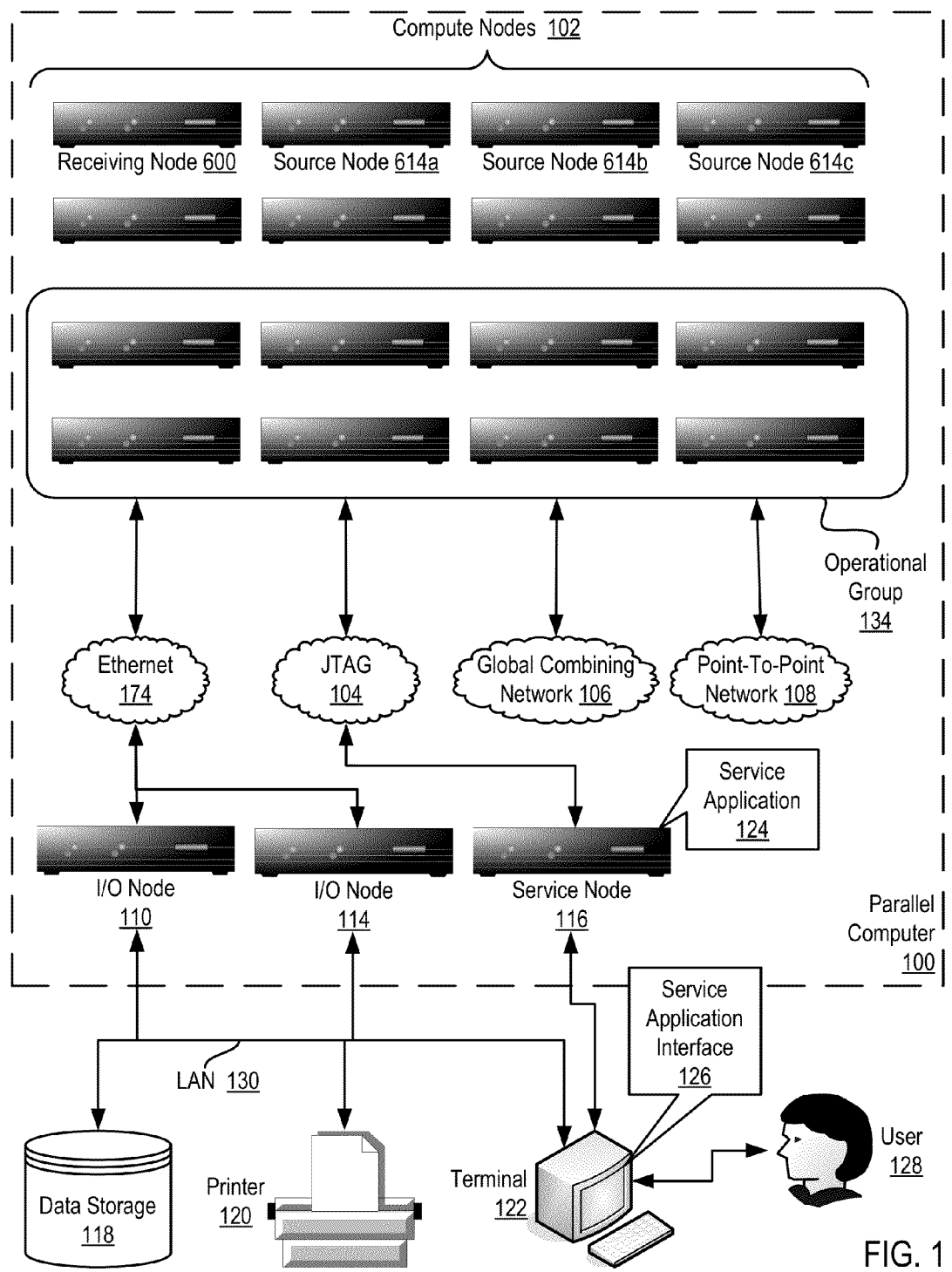
FIG. 1 sets forth an example system for send-side matching of data communications messages in a distributed computing system that includes a plurality of compute nodes organized capable of collective operations according to embodiments of the present invention.

Example methods, apparatus, and products for send-side matching of data communications messages in a distributed computing system comprising a plurality of compute nodes organized for collective operations in accordance with the present invention are described with reference to the accompanying drawings, beginning with FIG. 1. FIG. 1 sets forth an example system capable of send-side matching of data communications messages in a distributed computing system that includes a plurality of compute nodes organized for collective operations according to embodiments of the present invention. Some collective operations use "message matching" to provide a send/receive interface to clients. Each send/recv typically has three identifiers: rank, tag, and communicator. To match messages, a data communications operation will send a header to the recipient process specifying these three identifiers. The recipient will then decide how to handle the message. It is possible for the client to request a receive from ANY_SOURCE, which means that the sender rank can be any process. One algorithm that can improve performance on certain types of computer hardware is "send-side matching". Instead of sending the data immediately (which could require temp buffers on the reception process), or using a handshake to agree when the send should occur (which involves extra ping-pong messages to coordinate), the receiver merely sends a message to the sender when the receiver is ready to receive. This receive message specifies the location of the reception buffer along with other match information. When the sender matches on its side, the data is streamed directly into the receive buffer. The ANY_SOURCE wildcard complicates this, because the reception process does not know which process will be the sender.

The system of FIG. 1, configured to address this ANY_SOURCE issue, includes a parallel computer (100), non-volatile memory for the computer in the form of a data storage device (118), an output device for the computer in the form of a printer (120), and an input/output device for the computer in the form of a computer terminal (122). The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of a operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of a operational group. A 'reduce' operation is an example of a collective operation that executes arithmetic or logical functions on data distributed among the compute nodes of a operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for performing an allreduce operation using shared memory according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for send-side matching of data communications messages in a distributed computing system comprising a plurality of compute nodes organized for collective operations. In send-side matching of data communications messages in the example apparatus of FIG. 1, a receiving node (600) issues to a plurality of source nodes (614a, 614b, 614c), a receive message that specifies receipt of a single message to be sent from any source node. The receive message of FIG. 1 can include message matching information, a specification of a hardware-level mutual exclusion device in the receiving node (600), and an identification of a receive buffer. In send-side matching of data communications messages in the example apparatus of FIG. 1, two or more of the source nodes (614a, 614b, 614c) match the receive message with pending send messages in the two or more source nodes (614a, 614b, 614c). In send-side matching of data communications messages in the example apparatus of FIG. 1, one of the source nodes (614a, 614b, 614c) having a matching send message operates the mutual exclusion device in the receiving node (600), excluding messages from other source nodes with matching send messages and identifying to the receiving node (600) the source node operating the mutual exclusion device. In send-side matching of data communications messages in the example apparatus of FIG. 1, the source node operating the mutual exclusion device sends a matched pending send message to the receiving node (600). In the example of FIG. 1, the receiving node (600) issues to the plurality of source nodes (614a, 614b, 614c) a cancellation message that cancels the receive message.

In the example of FIG. 1, a receiving node (600) that issues a receive message to a plurality of source nodes (614a, 614b, 614c) can also initialize the mutual exclusion device in the receiving node (600) to an unlocked state. A source node (614a, 614b, 614c) may operate the mutual exclusion device through a hardware Read-Modify-Write ('RMW') mechanism on the receiving node (600) to atomically obtain a lock on a first predefined memory location and write an identifier of the source node into a second predefined memory location on the receiving node (600). Alternatively, a source node (614*a*, 614*b*, 614*c*) may operate the mutual exclusion device through a hardware Test-And-Set ('T&S') mechanism on the receiving node (600) to atomically obtain a lock on a predefined memory location and write an identifier of the source node into the predefined memory location on the receiving node (600). A source node (614*a*, 614*b*, 614*c*) may also operate the mutual exclusion device a through hardware Fetch-And-Increment ('F&I') mechanism on the receiving node (600) to atomically obtain a lock on a predefined memory location and write an identifier of the source node into the predefined memory location on the receiving node (600).

The arrangement of nodes, networks, and I/O devices making up the example apparatus illustrated in FIG. 1 are for explanation only, not for limitation of the present invention. Apparatus capable of send-side matching of data communications messages according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of send-side matching of data communications messages to embodiments of the present invention sometimes include thousands of compute nodes. In addition to Ethernet (174) and JTAG (104), networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Send-side matching of data communications messages in a distributed computing system according to embodiments of the present invention is generally implemented on a parallel computer that includes a plurality of compute nodes organized for collective operations. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (152) useful in a parallel computer capable of send-side matching of data communications messages according to embodiments of the present invention. The compute node (152) of FIG. 2 includes a plurality of processing cores (164) as well as random access memory ('RAM') (156). The processing cores (164) of FIG. 2 may be configured on one or more integrated circuit dies. Processing cores (164) are connected to RAM (156) through a high-speed memory bus (154) and through a bus adapter (194) and an extension bus (168) to other components of the compute node. Stored in RAM (156) is an application program (158), a module of computer program instructions that carries out parallel, user-level data processing using parallel algorithms.

Also stored RAM (156) is a parallel communications library (160), a library of computer program instructions that carry out parallel communications among compute nodes, including point-to-point operations as well as collective operations. Application program (158) executes collective operations by calling software routines in parallel communications library (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
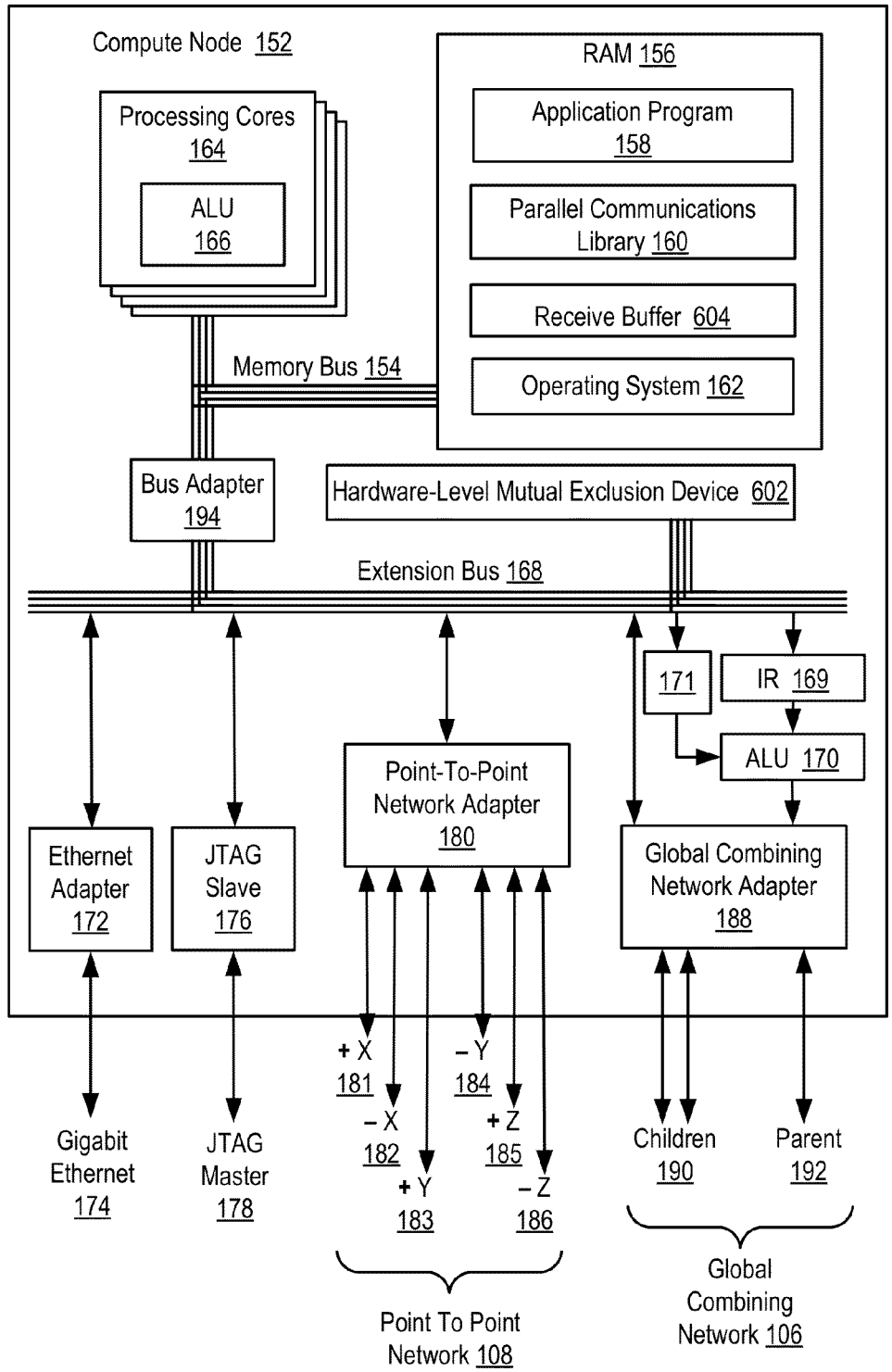
FIG. 2 sets forth a block diagram of an example compute node useful in send-side matching of data communications messages according to embodiments of the present invention.

The example compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems that dynamically reassign a connected node to a block of compute nodes for re-launching a failed job include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (152) for use in dynamically reassigning a connected node to a block of compute nodes for re-launching a failed job according to embodiments of the present invention.

The data communications adapters in the example of FIG. 2 include a Point-To-Point Network Adapter (180) that couples example compute node (152) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (152) for data communications to a network (106) that is optimal for collective message passing operations such as, for example, a network configured as a binary tree. The Global Combining Network Adapter (188) provides data communications through three bidirectional links: two to children nodes (190) and one to a parent node (192).

The example compute node (152) includes multiple arithmetic logic units ('ALUs'). Each processing core (164) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (160) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (164) or, typically much faster, by use of the dedicated ALU (170) using data provided by the nodes (190, 192) on the global combining network (106) and data provided by processing cores (164) on the compute node (152).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (162) on the compute node (152) contribute data that alters the output of ALU (170), which is then passed up or down the global combining network (106). Because the ALU (170) typically does not output any data onto the network (106) until the ALU (170) receives input from one of the processing cores (164), a processing core (164) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (152) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

The example compute node (152) of FIG. 2 also includes a receive buffer (604) for storing messages received from a source node, such as the source nodes depicted in FIG. 1. Although the receive buffer (604) of FIG. 2 is depicted as residing in RAM (156), the receive bugger (604) may be embodied as any other form of computer memory capable of storing messages received from a source node.

The compute node (152) of FIG. 2 also includes a hardware-level mutual exclusion device (602). The hardware-level mutual exclusion device (602) of FIG. 2 may include, for example, control logic, computer memory, and a bus interface for use in restricting access to a resource. In the example of FIG. 2, a predetermined location in the computer memory in the hardware-level mutual exclusion device (602) can be used to store a value representing the state of the hardware-level mutual exclusion device (602) such as, for example, locked or unlocked. In such an example, acquiring the lock to the hardware-level mutual exclusion device (602) may be carried out by reading the value representing the state of the hardware-level mutual exclusion device (602) to determine that the hardware-level mutual exclusion device (602) is unlocked, and writing a value to the predetermined location in the computer memory of the hardware-level mutual exclusion device (602) which indicates that the hardware-level mutual exclusion device (602) is locked. Such reads and writes may be carried out in a single instruction using atomic operations such as, for example, a T&S operation, a RMW operation, or a F&I operation.

Figure 3A:
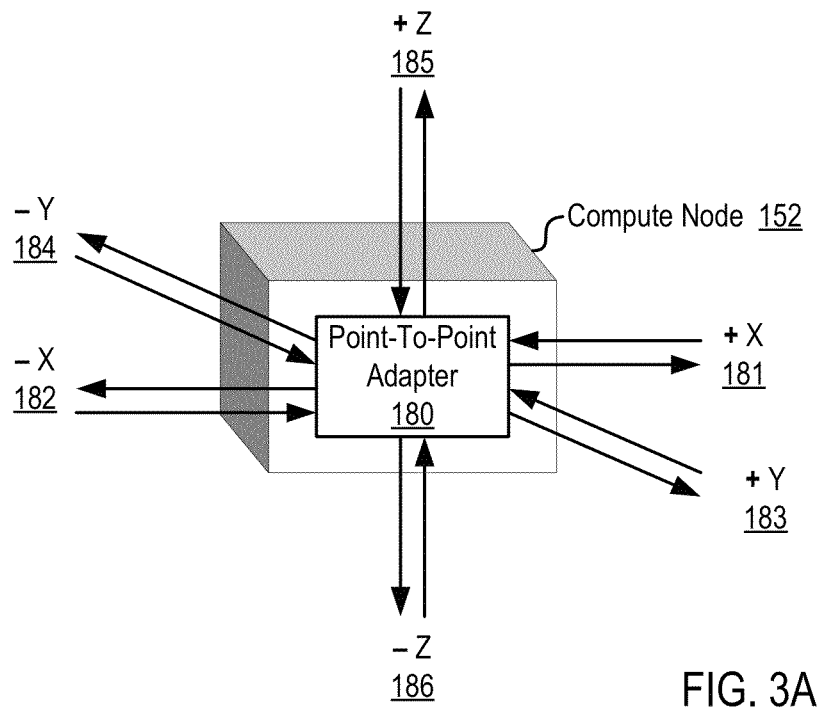
FIG. 3A sets forth a block diagram of an example Point-To-Point Adapter useful in systems capable of send-side matching of data communications messages according to embodiments of the present invention.

For further explanation, FIG. 3A sets forth a block diagram of an example Point-To-Point Adapter (180) useful in systems for send-side matching of data communications messages according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
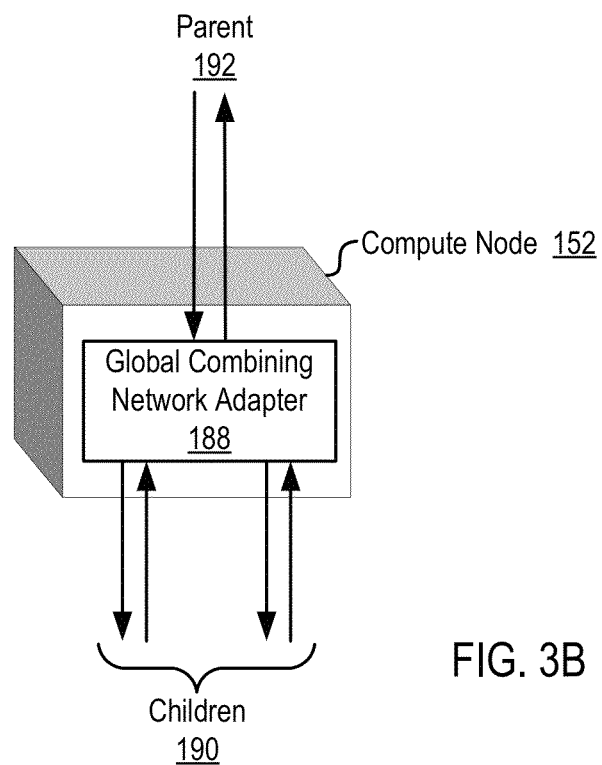
FIG. 3B sets forth a block diagram of an example Global Combining Network Adapter useful in systems capable of send-side matching of data communications messages according to embodiments of the present invention.

For further explanation, FIG. 3B sets forth a block diagram of an example Global Combining Network Adapter (188) useful in systems for send-side matching of data communications messages according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from two children nodes through four unidirectional data communications links (190). The Global Combining Network Adapter (188) also provides data communication to and from a parent node through two unidirectional data communications links (192).

Figure 4:
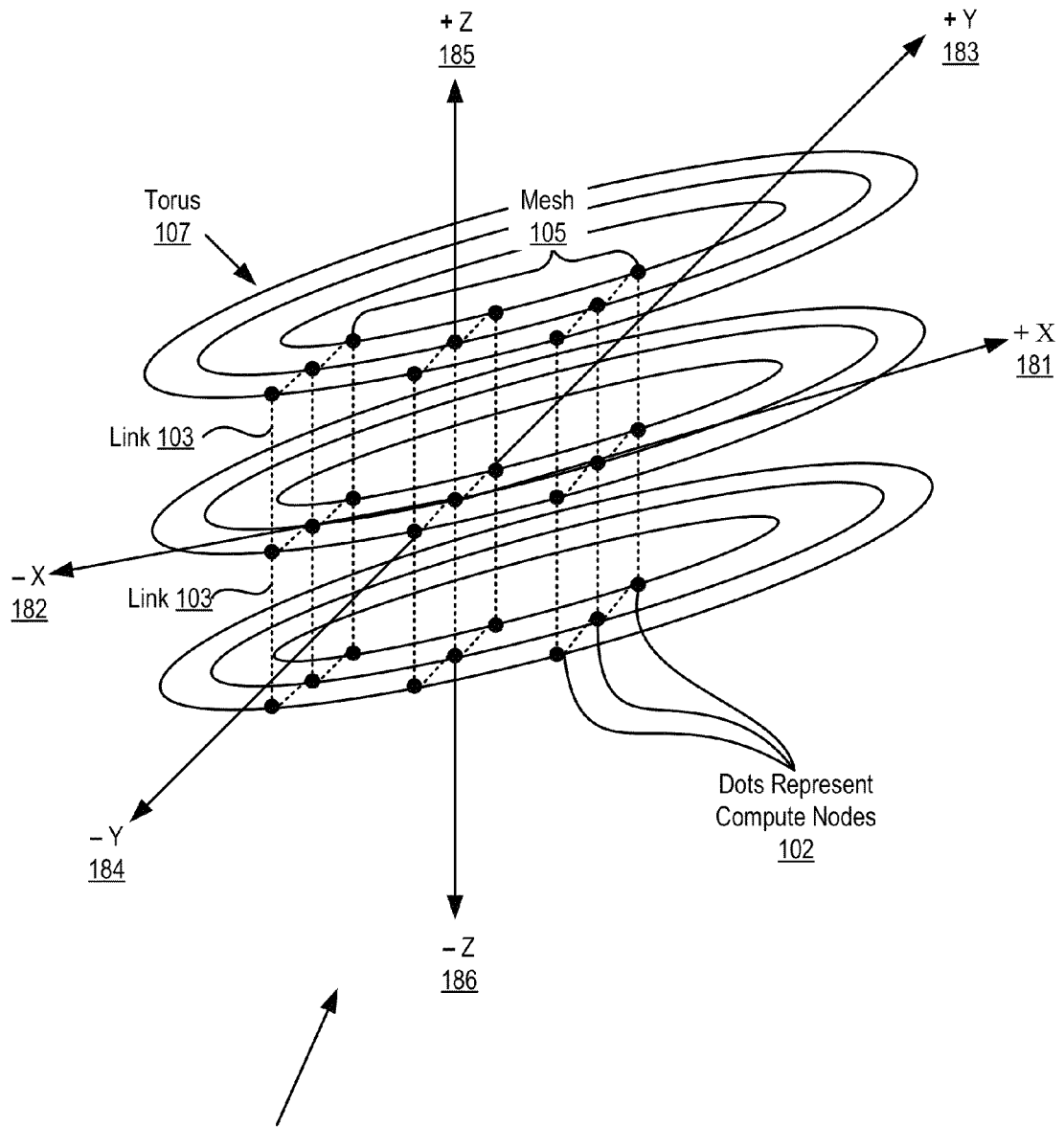
FIG. 4 sets forth a line drawing illustrating an example data communications network optimized for point-to-point operations useful in systems capable of send-side matching of data communications messages according to embodiments of the present invention.

For further explanation, FIG. 4 sets forth a line drawing illustrating an example data communications network (108) optimized for point-to-point operations useful in systems capable of send-side matching of data communications messages according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in send-side matching of data communications messages in accordance with embodiments of the present invention may contain only a few compute nodes or may contain thousands of compute nodes.

Figure 5:
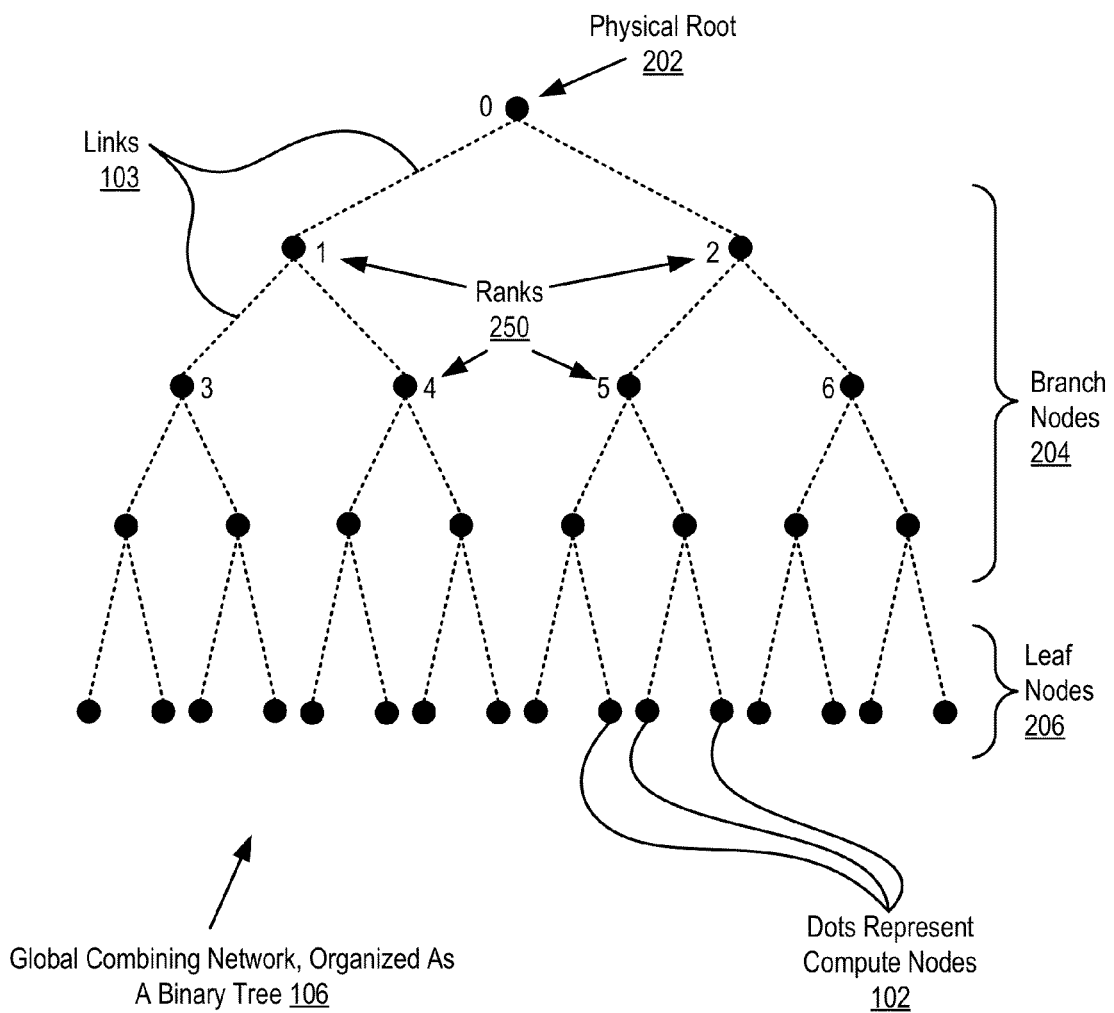
FIG. 5 sets forth a line drawing illustrating an example global combining network useful in systems capable of send-side matching of data communications messages according to embodiments of the present invention.

For further explanation, FIG. 5 sets forth a line drawing illustrating an example global combining network (106) useful in systems capable of send-side matching of data communications messages according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network optimized for collective operations for use in send-side matching of data communications messages in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
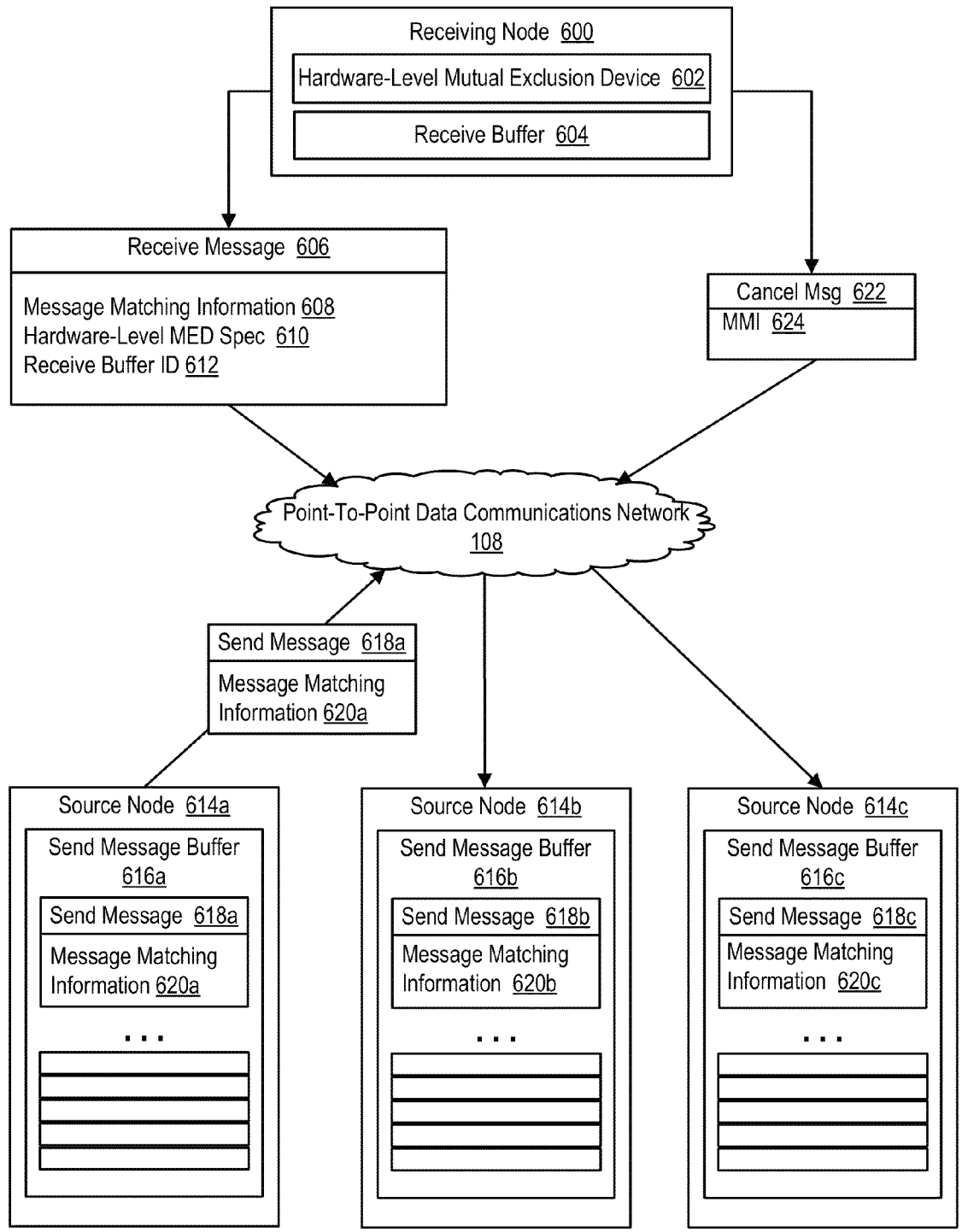
FIG. 6 sets forth a functional block diagram of example apparatus that implements send-side matching of data communications messages according to embodiments of the present invention.

For further explanation, FIG. 6 sets forth a functional block diagram of example apparatus that implements send-side matching of data communications messages according to embodiments of the present invention. The apparatus of FIG. 6 includes a receiving node (600) that implements send-side matching of data communications messages according to embodiments of the present invention. The receiving node (600) of FIG. 6 includes a hardware-level mutual exclusion device (602) and a receive buffer (604). In the example of FIG. 6, the hardware-level mutual exclusion device (602) may be embodied as a predetermined memory location capable of storing a value representing the state of the hardware-level mutual exclusion device (602) such as, for example, locked or unlocked. The mutual exclusion device can be implemented, for example, as a RMW device, a T&S device, or a F&I device. In the example of FIG. 6, the receive buffer (604) may be embodied as contiguous block of memory for storing messages received by the receiving node (600) or a as a non-contiguous block of memory for storing messages received by the receiving node (600).

The apparatus of FIG. 6 also includes a plurality of source nodes (614*a*, 614*b*, 614*c*) that carry out send-side matching of data communications messages according to embodiments of the present invention. The source nodes (614*a*, 614*b*, 614*c*) of FIG. 6 each include a send message buffer (616*a*, 616*b*, 616*c*) that includes send messages (618*a*, 618*b*, 618*c*) to be sent from the source nodes (614*a*, 614*b*, 614*c*). In the example of FIG. 6, the receive buffer (604) may be embodied as contiguous block of memory for storing messages received by the receiving node (600) or a as a non-contiguous block of memory for storing messages received by the receiving node (600).

Although the plurality of source nodes (614*a*, 614*b*, 614*c*) are depicted as including only a send message buffer (616*a*, 616*b*, 616*c*), readers will appreciate that each source node (614*a*, 614*b*, 614*c*) also includes a hardware-level mutual exclusion device and a receive buffer as is depicted in the receiving node (600)—because, although only one of the nodes is here characterized as a receiving node (600), readers will recognize that any of the compute nodes can function as a receiving node (600) and any of the compute nodes can function as a source node (614a, 614b, 614c) depending on their roles in any particular data communications function. Although the receiving node (600) is depicted as only including a hardware-level mutual exclusion device (602) and a receive buffer (604), readers will also appreciate that the receiving node (600) also includes a send message buffer as depicted in the source nodes (614a, 614b, 614c). The receiving node (600) and the source nodes (614a, 614b, 614c) are each computing nodes as described above with reference to FIG. 1. The designation of each compute node as a receiving node (600) or source node (614a, 614b, 614c) is based on whether the particular compute node issues a receive message (606) as described in more detail below. A compute node that issues a receive message (606) is designated as a receiving node, and all other compute nodes are designated as source nodes. Because a receiving node (600) does have a send message buffer, however, the receiving node (600) can act as a source node with respect to the receive message (606) issued by the receiving node (600).

In send-side matching of data communications messages in the example apparatus of FIG. 6, a receiving node (600) issues a receive message (606) that specifies receipt of a single message to be sent from any source node (614a, 614b, 614c) to a plurality of source nodes (614a, 614b, 614c). In the example of FIG. 6, the receiving node (600) may issue a receive message (606) to a plurality of source nodes (614a, 614b, 614c), for example, by broadcasting the receive message (606) to all connected source nodes (614a, 614b, 614c) over a data communications network such as, for example, a point-to-point data communications network (108) as described above with reference to FIG. 1. The receive message (606) of FIG. 6 indicates that the receiving node (600) is ready to receive the single message from any source node (614a, 614b, 614c) that receives the receive message (606). In such an example, the receiving node (600) can therefore control the rate at which it receives messages from the plurality of source nodes (614a, 614b, 614c) because the receiving node (606) will not receive the single message from a source node (614a, 614b, 614c) without first issuing a receive message (606) indicating that the receiving node (600) is ready to receive the single message from any source node (614a, 614b, 614c) that receives the receive message (606).

In the example of FIG. 6, the receive message (606) includes message matching information (608), a specification (610) of a hardware-level mutual exclusion device, and an identification (612) of a receive buffer. Message matching information (608) includes, for example, the rank of a source node (614a, 614b, 614c) that is to send a message to the receiving node (600) and a tag identifying the message to be sent to the receiving node (600). A particular source node (614a, 614b, 614c) that receives such message matching information (608) uses the message matching information (608) to determine whether the receiving node (600) is requesting that a send message (618a, 618b, 618c) be sent by the particular source node (614a, 614b, 614c) and to determine which pending send message (618a, 618b, 618c) stored at the particular source node (614a, 614b, 614c) is being requested by the receiving node (600). The specification (610) of a hardware-level mutual exclusion device (602) includes, for example, an identifier or address of a memory location that is used to store a value which represents the current state, such as locked or unlocked, of the mutual exclusion device (602).

In send-side matching of data communications messages in the example apparatus of FIG. 6, the receiving node (600) can initialize the hardware-level mutual exclusion device (602) to an unlocked state. The receiving node (600) can initialize the hardware-level mutual exclusion device (602) to an unlocked state, for example, by writing a value to a memory location that stores a value which represents the current state of the hardware-level mutual exclusion device (602). For example, a single bit in the memory location that stores a value which represents the current state of the hardware-level mutual exclusion device (602) may be used to indicate whether the hardware-level mutual exclusion device (602) is locked or unlocked. The single bit in the memory location that stores a value which represents the current state of the hardware-level mutual exclusion device (602) may be set to 0 when the hardware-level mutual exclusion device (602) is unlocked and set to 1 when the hardware-level mutual exclusion device (602) is locked, such that initializing the hardware-level mutual exclusion device (602) to an unlocked state may be carried out by writing a 0 to the memory location that stores a value which represents the current state of the hardware-level mutual exclusion device (602). This value may subsequently be read by processes that are attempting to acquire the lock and written to by processes as they acquire and relinquish the lock.

In send-side matching of data communications messages in the example apparatus of FIG. 6, two or more of the source nodes (614a, 614b, 614c) match the receive message (606) with pending send messages (618a, 618b, 618c) in the two or more source nodes (614a, 614b, 614c). Two or more of the source nodes (614a, 614b, 614c) may match the receive message (606) with pending send messages (618a, 618b, 618c) in the two or more source nodes, for example, by comparing the tags of each pending send message (618a, 618b, 618c) with message matching information (608) contained in the receive message (606). When the tag of a particular send message (618a, 618b, 618c) at a source node (614a, 614b, 614c) matches with the message matching information (608) contained in the receive message (606), a match has been made, thereby indicating that the particular send message (618a, 618b, 618c) at the source node (614a, 614b, 614c) is in fact the message requested by the receiving node (600) as indicated in the receive message (606).

In send-side matching of data communications messages in the example apparatus of FIG. 6, one of the source nodes (614a, 614b, 614c) having a matching send message (618a, 618b, 618c) operates the mutual exclusion device (602). One of the source nodes (614a, 614b, 614c) operates the mutual exclusion device (602), for example, by acquiring a lock to the mutual exclusion device (602). In the example of FIG. 6, operating the mutual exclusion device (602) includes excluding messages from other source nodes with matching send messages and identifying to the receiving node (600) the source node operating the mutual exclusion device. A source node (614a) that operating the hardware-level mutual exclusion device (602) is therefore the only source node (614a) that can issue a send message (618a) to the receiving node (600) via the point-to-point data communications network (108). Because other source nodes (614b, 614c) receive the receive message (606) from receiving node (600), and because the receiving node (600) only needs to receive the single message identified in the receive message (606) from one source node (614a), the remaining receiving nodes (614b, 614c) that are not operating the hardware-level mutual exclusion device (602) do not need to issue duplicate copies of the pending send messages (618b, 618c) in the remaining source nodes (614b, 614c). As such, only one source node (614a) should send, to the receiving node (606), its pending send message (618a) that matches the message matching information (608) included in the receive message (606). In the example of FIG. 6, this is accomplished through the use of the hardware-level mutual exclusion device (602) as the source node (614a) that operates the hardware-level mutual exclusion device (602) is the only source node (614a) that is authorized to send its pending send message (618a) that matches the message matching information (608) included in the receive message (606) to the receiving node (600).

In send-side matching of data communications messages in the example apparatus of FIG. 6, a source node (614a, 614b, 614c) may operate the hardware-level mutual exclusion device (602) using a hardware RMW mechanism on the receiving node (600) to atomically obtain a lock on a first predefined memory location and write an identifier of the source node (614a) into a second predefined memory location on the receiving node (600). In such an example, the first predefined memory location that is read, modified, and written to may be initialized to 0, indicating that the hardware-level mutual exclusion device (602) is unlocked. A source node (614a, 614b, 614c) attempting to acquire the lock may therefore utilize a RMW command to read the value of the first predefined memory location and write a 1 to the first predefined memory location, indicating that the hardware-level mutual exclusion device (602) is locked. Because a RMW command is atomic, only one source node (614a) that attempts to acquire the lock will have a 0 returned from its RMW command and all subsequent RMW commands from other source nodes (614b, 614c) will have a 1 returned. Each source node (614a, 614b, 614c) may therefore send its pending send message (618a, 618b, 618c) that matches the message matching information (608) included in the receive message (606) only when a 0 is returned from its RMW command, thereby ensuring that the receiving node (600) only receives one instance of the single message identified in the receive message (606).

In send-side matching of data communications messages in the example apparatus of FIG. 6, a source node (614a, 614b, 614c) may alternatively operate the hardware-level mutual exclusion device (602) using a hardware T&S mechanism on the receiving node (600) to atomically obtain a lock on a predefined memory location and write an identifier of the source node (614a) into the predefined memory location on the receiving node (600). In such an example, the first predefined memory location that is tested and set may be initialized to 0, indicating that the hardware-level mutual exclusion device (602) is unlocked. A source node (614a, 614b, 614c) attempting to acquire the lock may therefore utilize a T&S command to read the value of the first predefined memory location and write a 1 to the first predefined memory location, indicating that the hardware-level mutual exclusion device (602) is locked. Because a T&S command is atomic, only one source node (614a) that attempts to acquire the lock will have a 0 returned from its T&S command and all subsequent T&S commands from other source nodes (614b, 614c) will have a 1 returned. Each source node (614a, 614b, 614c) may therefore send its pending send message (618a, 618b, 618c) that matches the message matching information (608) included in the receive message (606) only when a 0 is returned from its T&S command, thereby ensuring that the receiving node (600) only receives one instance of the single message identified in the receive message (606).

In send-side matching of data communications messages in the example apparatus of FIG. 6, a source node (614a, 614b, 614c) may alternatively operate the hardware-level mutual exclusion device (602) using a hardware F&I mechanism on the receiving node (600) to atomically obtain a lock on a predefined memory location and write an identifier of the source node (614a) into the predefined memory location on the receiving node (600). In such an example, the first predefined memory location that is tested and set may be initialized to 0, indicating that the hardware-level mutual exclusion device (602) is unlocked. A source node (614a, 614b, 614c) attempting to acquire the lock may therefore utilize a F&I command to read the value of the first predefined memory location and write a 1 to the first predefined memory location, indicating that the hardware-level mutual exclusion device (602) is locked. Because a F&I command is atomic, only one source node (614a) that attempts to acquire the lock will have a 0 returned from its F&I command and all subsequent F&I commands from other source nodes (614b, 614c) will have something other than a 0 returned. Each source node (614a, 614b, 614c) may therefore send its pending send message (618a, 618b, 618c) that matches the message matching information (608) included in the receive message (606) only when a 0 is returned from its F&I command, thereby ensuring that the receiving node (600) only receives one instance of the single message identified in the receive message (606).

In send-side matching of data communications messages in the example apparatus of FIG. 6, the source node (614a) operating the hardware-level mutual exclusion device (602) sends a matched pending send message (618a) to the receiving node (600). The source node (614a) operating the hardware-level mutual exclusion device (602) may send a matched pending send message (618a) to the receiving node (600), for example, using the MPI_Send function of the MPI library to transmit the send message (618a) over the point-to-point data communications network (108).

In send-side matching of data communications messages in the example apparatus of FIG. 6, the receiving node (606) issues a cancellation message (622) that cancels the receive message (606) to the plurality of source nodes (614a, 614b, 614c). In the example of FIG. 6, each source node (614b, 614c) that did not operate the hardware-level mutual exclusion device (602), and therefore did not send a message to the receiving node (600), does not need to send its send message (618b, 618c) that corresponds to the receive message (606) issued by the receiving node (600) to the receiving node (600). The receiving node (600) therefore may avoid the receipt of duplicate messages by issuing to the plurality of source nodes (614a, 614b, 614c) a cancellation message (622) that cancels the receive message (606) such that no other source nodes (614b, 614c) will send a send message (618b, 618c) in response to the receive message (606). The cancellation message (622) of FIG. 6 may include message matching information (624) to identify the receive message (606) that is to be disregarded, and the cancellation message (622) may be broadcast to all connected source nodes (614a, 614b, 614c).

Figure 7:
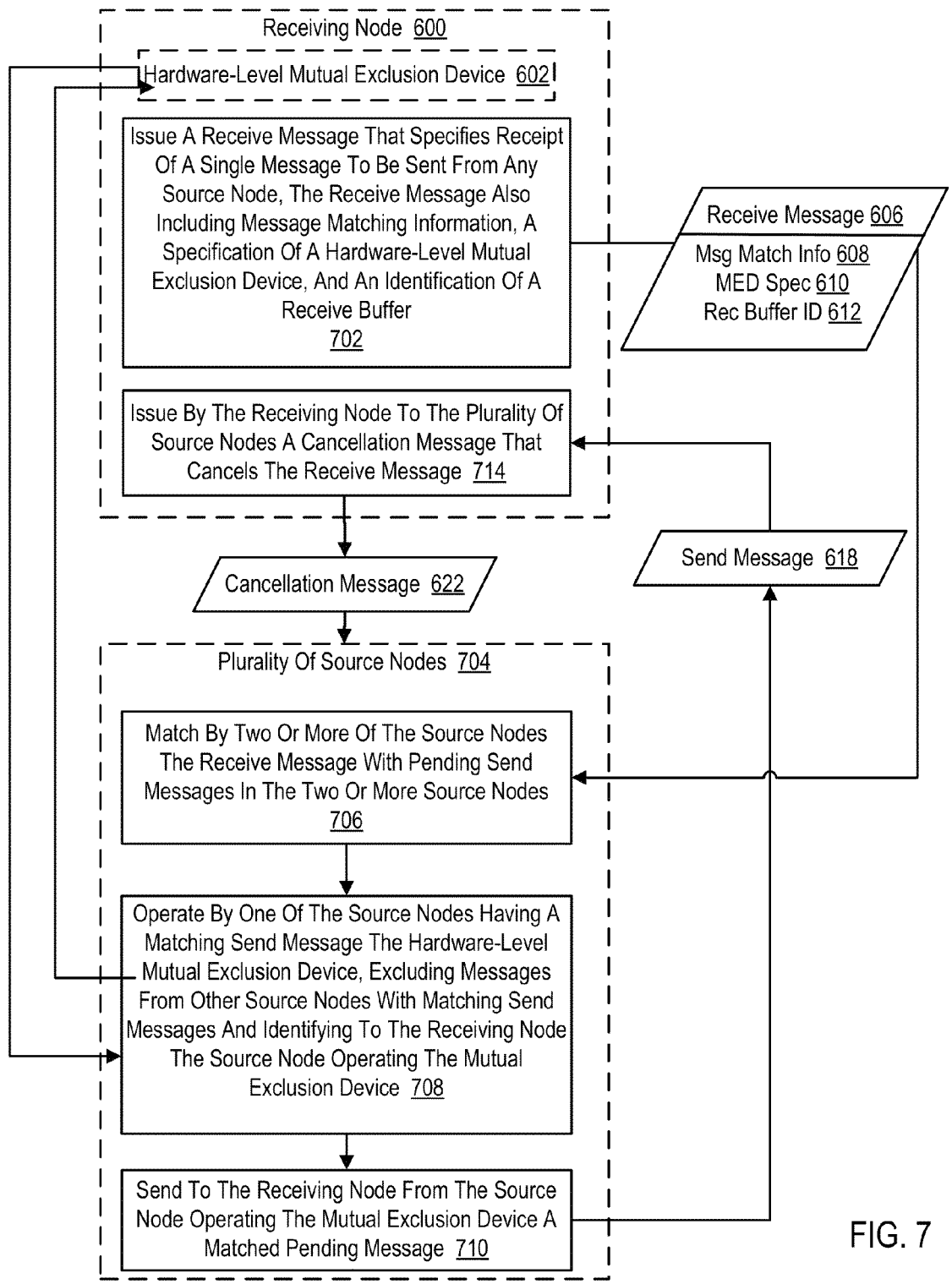
FIG. 7 sets forth a flow chart illustrating an example method for send-side matching of data communications messages in a distributed computing system comprising a plurality of compute nodes organized for collective operations according to embodiments of the present invention.

For further explanation, FIG. 7 sets forth a flow chart illustrating an example method for send-side matching of data communications messages in a distributed computing system comprising a plurality of compute nodes organized for collective operations according to embodiments of the present invention. The example of FIG. 7 includes issuing (702), by a receiving node (600) to a plurality of source nodes (704), a receive message (606) that specifies receipt of a single message to be sent from any source node. In the example of FIG. 7, issuing (702) a receive message (606) to a plurality of source nodes (704) may be carried out, for example, by broadcasting the receive message (606) to all connected source nodes. The receive message (606) of FIG. 7 indicates that the receiving node (600) is ready to receive the single message from any source node that receives the receive message (606). In such an example the receiving node (600) can therefore control the rate at which it receives messages from the plurality of source nodes (704) because the receiving node (600) will not receive the single message from a source node without first issuing a receive message (606) indicating that the receiving node (600) is ready to receive the single message from any source node that receives the receive message (606).

In the example of FIG. 7, the receive message (606) includes message matching information (608), a specification (610) of a hardware-level mutual exclusion device (602), and an identification (612) of a receive buffer. Message matching information (608) may include, for example, the rank of a source node that is to send a message to the receiving node (600) and a tag identifying the message to be sent to the receiving node (600). A particular source node that receives such message matching information (608) may use the message matching information (608) to determine whether the receiving node (600) is requesting that a message be sent by the particular source node and to determine which pending send message (618) stored at the particular source node is being requested by the receiving node (606). The specification (610) of a hardware-level mutual exclusion device (602) may include, for example, an identifier or address of a memory location that is used to store a value which represents the current state, such as locked or unlocked, of the hardware-level mutual exclusion device (602).

The example of FIG. 7 also includes matching (706), by two or more of the source nodes, the receive message (606) with pending send messages in the two or more source nodes. Matching (706) the receive message (606) with pending send messages in the two or more source nodes may be carried out, for example, by comparing the tags of each pending send messages with the message matching information (608) in the receive message (606). When the tag of a particular send message at a source node matches with the message matching information (608) contained in the receive message (606), a match has been made, thereby indicating that the particular send message (618) at the source node is in fact the message requested by the receiving node (600) as indicated in the receive message (606).

The example of FIG. 7 also includes operating (708), by one of the source nodes having a matching send message, the hardware-level mutual exclusion device (602). Operating (708) the hardware-level mutual exclusion device (602) may be carried out, for example, by acquiring a lock to the hardware-level mutual exclusion device (602). In the example of FIG. 7, operating (608) the hardware-level mutual exclusion device (602) includes excluding messages from other source nodes with matching send messages and identifying to the receiving node (600) the source node operating the hardware-level mutual exclusion device (602). In the example of FIG. 7, multiple source nodes receive the receive message (606) from the receiving node (600) and at least two or more of the source nodes match the receive message (606) with pending send messages in the two or more source nodes. The receiving node (600), however, only needs to receive the single message identified in the receive message (600) from one source node. The receiving node (600) does not need to receive the duplicate copies of each pending send message in the two or more source nodes. As such, only one source node should send its pending send message that matches the message matching information (608) included in the receive message (606) to the receiving node (600). In the example of FIG. 7, this is accomplished through the use of the hardware-level mutual exclusion device (602) because the source node that operates the hardware-level mutual exclusion device (602) is the only source node that is authorized to send its pending send message that matches the message matching information (608) included in the receive message (606) to the receiving node (600).

The example of FIG. 7 also includes sending (710), to the receiving node (600) from the source node operating the hardware-level mutual exclusion device (602), a matched pending send message (618). Sending (614), to the receiving node (600) from the source node operating the hardware-level mutual exclusion device (602), a matched pending send message (618) may be carried out, for example, using the MPI_Send function of the MPI library.

The example of FIG. 7 also includes issuing (714) by the receiving node (600) to the plurality of source nodes (704) a cancellation message (622) that cancels the receive message (606). In the example of FIG. 7, each source node that did not operate the hardware-level mutual exclusion device (602), and therefore did not send a message to the receiving node (600), does not need to send a message to the receiving node (600) that corresponds to the receive message (606) issued (702) by the receiving node (600). The receiving node (600) therefore may avoid the receipt of duplicate messages by issuing (714) to the plurality of source nodes (704) a cancellation message (622) that cancels the receive message (606) such that no other source nodes will send a message in response to the receive message (606). The cancellation message (622) of FIG. 7 may be broadcast to all connected source nodes to cancel the receive message (606) that was previously broadcast to each of the source nodes.

Figure 8:
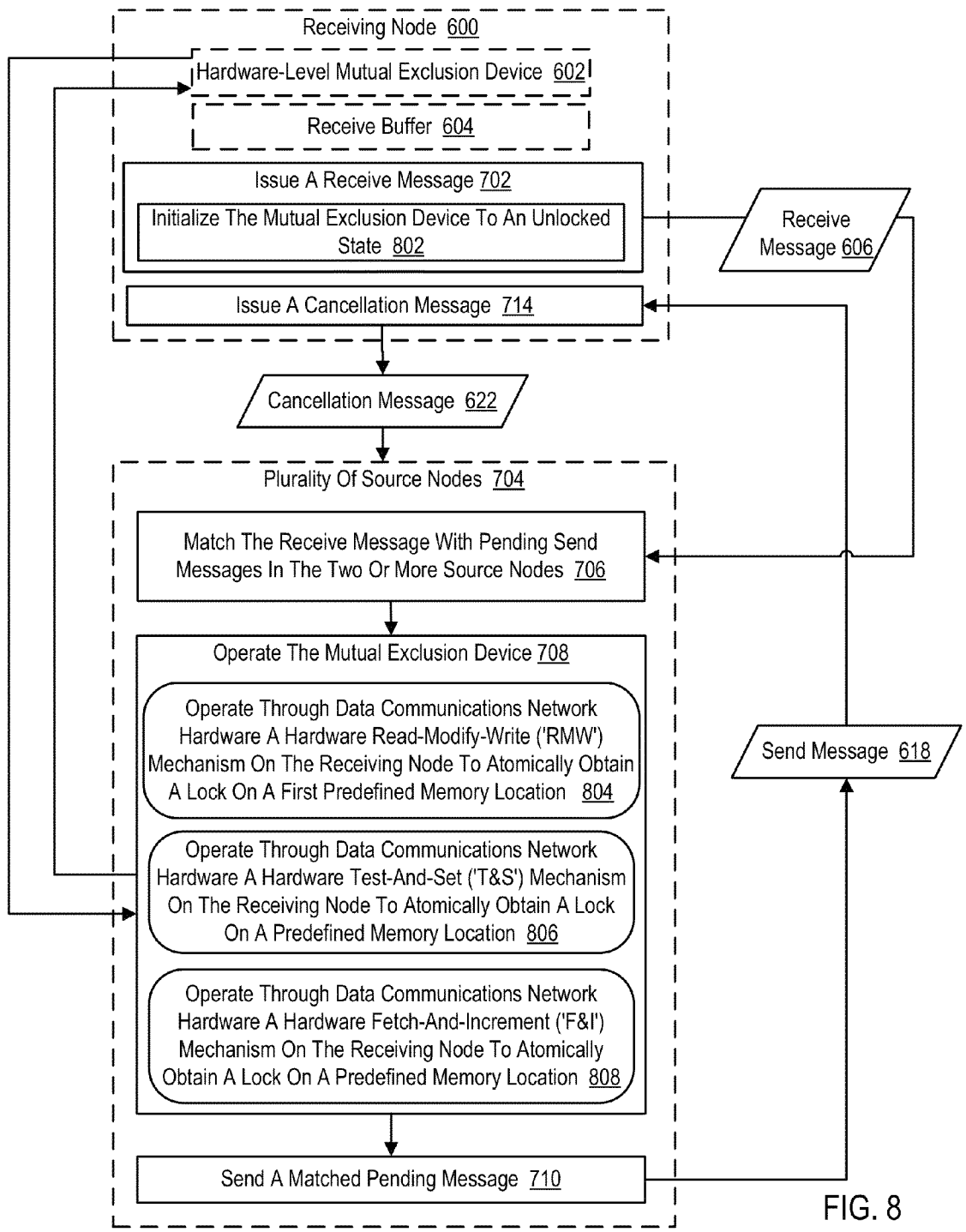
FIG. 8 sets forth a flow chart illustrating an example method for send-side matching of data communications messages in a distributed computing system comprising a plurality of compute nodes organized for collective operations according to embodiments of the present invention.

For further explanation, FIG. 8 sets forth a flow chart illustrating an example method for send-side matching of data communications messages in a distributed computing system comprising a plurality of compute nodes organized for collective operations according to embodiments of the present invention. The example of FIG. 8 is similar to the example of FIG. 7 as it also includes issuing (702) a receive message (606), matching (706) the receive message with pending send messages in tow or more source nodes, operating (708) the hardware-level mutual exclusion device (602), sending a matched pending send message (710), and issuing (714) a cancellation message (622) as described above with reference to FIG. 7.

In the example of FIG. 8, however, issuing (702) a receive message (606) also includes include initializing (802) the hardware-level mutual exclusion device (602) to an unlocked state. Initializing (802) the hardware-level mutual exclusion device (602) to an unlocked state may be carried out, for example, by writing a value to an address of a memory location that stores a value which represents the current state of the hardware-level mutual exclusion device (602). For example, a single bit in the memory location that stores the value which represents the current state of the hardware-level mutual exclusion device (602) may be used to indicate whether the hardware-level mutual exclusion device (602) is locked or unlocked. The single bit in the memory location that stores the value which represents the current state of the hardware-level mutual exclusion device (602) may be set to 0 when the hardware-level mutual exclusion device (602) is unlocked and set to 1 when the hardware-level mutual exclusion device (602) is locked, such that initializing (802) the hardware-level mutual exclusion device (602) to an unlocked state may be carried out by writing a 0 to the memory location that stores the value which represents the current state of the hardware-level mutual exclusion device (602). This value may subsequently be read by processes that are attempting to acquire the lock to the hardware-level mutual exclusion device (602) and written to by processes as they acquire and relinquish the lock.

In the example of FIG. 8, operating (708) the hardware-level mutual exclusion device (602) can include operating (804), through data communications network hardware, a hardware RMW mechanism on the receiving node (600) to atomically obtain a lock on a first predefined memory location and write an identifier of the source node into a second predefined memory location on the receiving node (600). In such an example, the first predefined memory location that is read, modified, and written to may be initialized to 0, indicating that the hardware-level mutual exclusion device (602) is unlocked. A source node that is attempting to acquire the lock may therefore utilize a RMW command to read the value of the first predefined memory location and write a 1 to the first predefined memory location, indicating that the hardware-level mutual exclusion device (602) is locked. Because a RMW command is atomic, only one source node that attempts to acquire the lock will have a 0 returned from its RMW command and all subsequent RMW commands from other source nodes will have a 1 returned. Each source node may therefore send its pending send message (618) that matches the message matching information included in the receive message (606) only when a 0 is returned from its RMW command, thereby ensuring that the receiving node (600) only receives one instance of the single message identified in the receive message (606) issued (702) by the receiving node (600).

In the example of FIG. 8, operating (708) the hardware-level mutual exclusion device (602) may alternatively include operating (806), through data communications network hardware, a hardware T&S mechanism on the receiving node (600) to atomically obtain a lock on a predefined memory location and write an identifier of the source node into the predefined memory location on the receiving node (600). In such an example, the first predefined memory location that is tested and set may be initialized to 0, indicating that the hardware-level mutual exclusion device (602) is unlocked. A source node that is attempting to acquire the lock may therefore utilize a T&S command to read the value of the first predefined memory location and write a 1 to the first predefined memory location, indicating that the hardware-level mutual exclusion device (602) is locked. Because a T&S command is atomic, only one source node that attempts to acquire the lock will have a 0 returned from its T&S command and all subsequent T&S commands from other source nodes will have a 1 returned. Each source node may therefore send its pending send message (618) that matches the message matching information included in the receive message (606) only when a 0 is returned from its T&S command, thereby ensuring that the receiving node (600) only receives one instance of the single message identified in the receive message (606) issued (702) by the receiving node (600).

In the example of FIG. 8, operating (708) the hardware-level mutual exclusion device (602) may alternatively include operating (808), through data communications network hardware, a hardware F&I mechanism on the receiving node (600) to atomically obtain a lock on a predefined memory location and write an identifier of the source node into the predefined memory location on the receiving node (600). In such an example, the first predefined memory location that is fetched and incremented may be initialized to 0, indicating that the hardware-level mutual exclusion device (602) is unlocked. A source node that is attempting to acquire the lock may therefore utilize a F&I command to read the value of the first predefined memory location and increment the value by writing a 1 to the first predefined memory location, indicating that the hardware-level mutual exclusion device (602) is locked. Because a F&I command is atomic, only one source node that attempts to acquire the lock will have a 0 returned from its T&S command and all subsequent T&S commands from other source nodes will have something other than a 1 returned. Each source node may therefore send its pending send message (618) that matches the message matching information included in the receive message (606) only when a 0 is returned from its F&I command, thereby ensuring that the receiving node (600) only receives one instance of the single message identified in the receive message (606) issued (702) by the receiving node (600).

Figure 9:
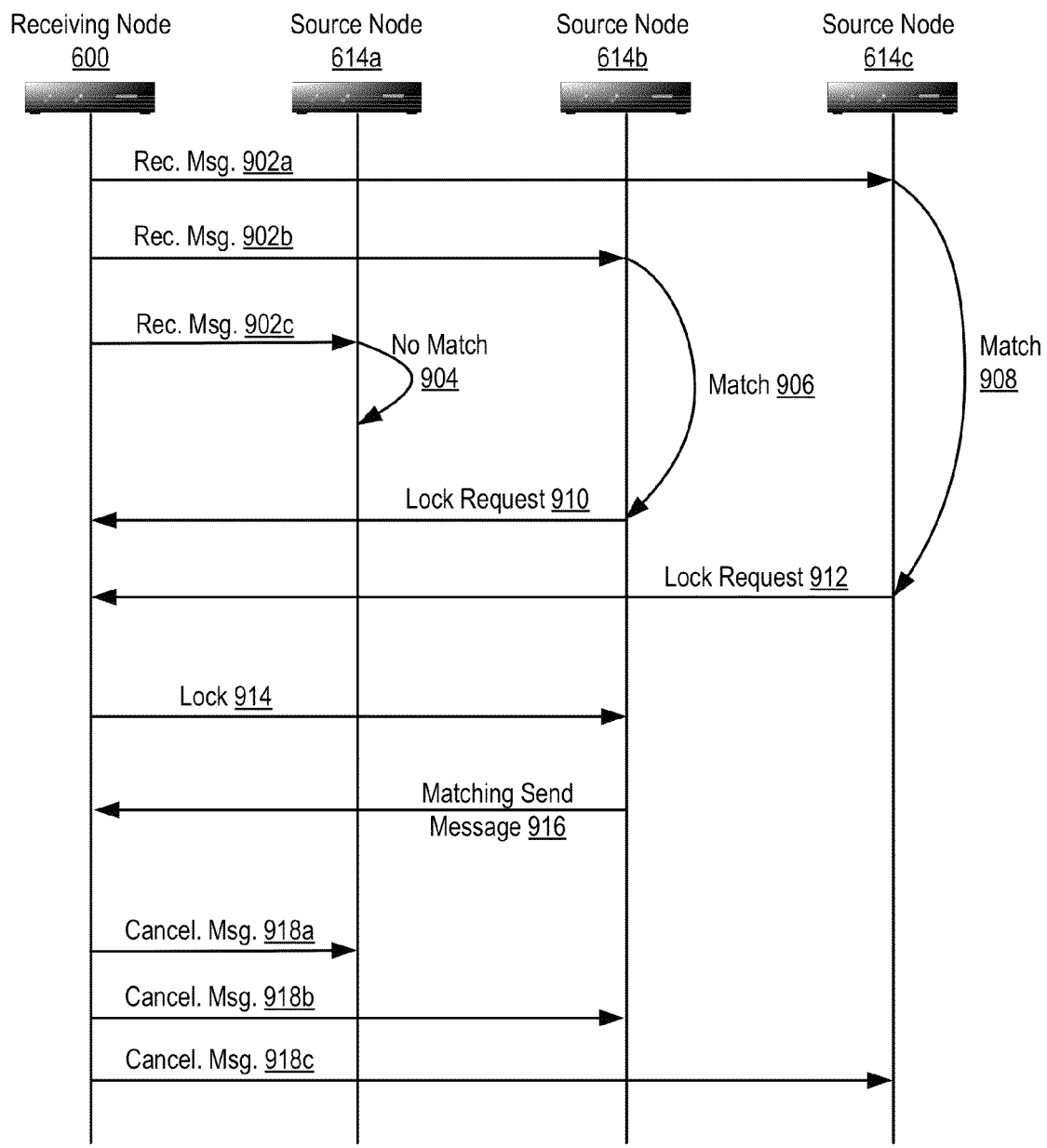
FIG. 9 sets forth a call sequence diagram illustrating an example call sequence for send-side matching of data communications messages in a distributed computing system comprising a plurality of compute nodes organized for collective operations according to embodiments of the present invention.

For further explanation, FIG. 9 sets forth a call sequence diagram illustrating an example call sequence for send-side matching of data communications messages in a distributed computing system comprising a plurality of compute nodes organized for collective operations according to embodiments of the present invention. The example call sequence diagram a receiving node (600) and three source nodes (614a, 614b, 614c). In the calling sequence diagram of FIG. 9, the receiving node (600) issues receive messages (902a, 902b, 902c) to all the source nodes (614a, 614b, 614c), where the receive messages specifies receipt of a single message to be sent from any source node (614a, 614b, 614c). Although the receive messages are depicted as being distinct messages, each message may actually be a single broadcast message delivered to all connected source nodes (614a, 614b, 614c). Upon receipt of a receive message (902a, 902b, 902c), each source node (614a, 614b, 614c) examines its send buffer for a matching send message. In this example, source node (614a) finds no match (904), but source nodes (614b, 614c) both have matching (906, 908) send messages. The source nodes (614b, 614c) with matching (906, 908) send messages attempt to operate the hardware-level mutual exclusion device by transmitting a lock request (910, 912) to the mutual exclusion device in the receiving node (600). In the example calling sequence diagram of FIG. 9, source node (614b) is the first source node that attempts (904) to operate the hardware-level mutual exclusion device by sending a lock request (910). In the example calling sequence diagram of FIG. 9, this is the first attempt to operate the hardware-level mutual exclusion device, which is initialized to an unlocked state. As such, a lock (914) is returned to the source node (914b) that issued the first lock request (910). In attempting to operate the hardware-level mutual exclusion device, the source node (614b) that has acquired the lock (914) locks the hardware-level mutual exclusion device by, for example, writing a value to a predetermined memory location in the receiving node (600).

In the example of FIG. 9, one of the source nodes (614b) having a matching (906) send message operates the hardware-level mutual exclusion device, excluding messages from other source nodes with matching send messages. In this example, the two source nodes (614b, 614c) having matches (906, 908) are in a race for the lock (914), and source node (614b) wins the race and receives the lock (914). The lock request (910) carried the identity of source node (614b), identifying to the receiving node the source node operating the hardware-level mutual exclusion device. In the example calling sequence diagram of FIG. 9, source node (614c) is the next source node that attempts to operate the hardware-level mutual exclusion device by issuing a lock request (912). Because the hardware-level mutual exclusion device was locked by source node (614b), a return value indicating that the lock (914) was not acquired will be returned to source node (614c) such that source node (614c) is not authorized to issue a send message to the receiving node (600) in response to the receive message. Although not illustrated in the example calling sequence diagram of FIG. 9, source node (614c) could continue making attempts to operate the hardware-level mutual exclusion device, none of which would be successful as source node (614b) has possession of the lock (194). Because source node (614b) has possession of the lock, the source node (614b) issues a send message (916) that matches information contained in the receive messages (902a, 902b, 902c). Once the receiving node (600) has received the send message (916), the receiving node can issue cancellation messages (918a, 918b, 918c) to prevent other source nodes (614a, 614c) from attempting to respond to the receive messages (902a, 902c). Although the cancellation messages (918a, 918b, 918c) are depicted as being distinct messages, each message may actually be a single broadcast message delivered to all connected source nodes (614a, 614b, 614c)

Example embodiments of the present invention are described largely in the context of a fully functional computer system for send-side matching of data communications messages. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of send-side matching of data communications messages in a distributed computing system comprising a plurality of compute nodes organized for collective operations, the method comprising:

issuing, by a receiving node to a plurality of source nodes, a receive message that specifies receipt of a single message to be sent from any source node, the receive message also including message matching information, a specification of a hardware-level mutual exclusion device, and an identification of a receive buffer;

matching by two or more of the source nodes the receive message with pending send messages in the two or more source nodes by comparing the tags of each pending send messages with the message matching information in the receive message;

operating by one of the source nodes having a matching send message the hardware-level mutual exclusion device, excluding messages from other source nodes with matching send messages and identifying to the receiving node the source node operating the hardware-level mutual exclusion device;

in response to identifying to the receiving node the source node operating the hardware-level mutual exclusion device, issuing, by the receiving node, a cancellation message to the other source nodes that cancels the matching send messages; and sending to the receiving node from the source node operating the hardware-level mutual exclusion device a matched pending send message.

2. The method of claim 1 wherein issuing a receive message further comprises initializing the hardware-level mutual exclusion device to an unlocked state.

3. The method of claim 1 wherein operating the hardware-level mutual exclusion device further comprises operating through data communications network hardware a hardware Read-Modify-Write ('RMW') mechanism on the receiving node to atomically obtain a lock on a first predefined memory location and write an identifier of the source node into a second predefined memory location on the receiving node.

4. The method of claim 1 wherein operating the hardware-level mutual exclusion device further comprises operating through data communications network hardware a hardware Test-And-Set ('T&S') mechanism on the receiving node to atomically obtain a lock on a predefined memory location and write an identifier of the source node into the predefined memory location on the receiving node.

5. The method of claim 1 wherein operating the hardware-level mutual exclusion device further comprises operating through data communications network hardware a hardware Fetch-And-Increment ('F&I') mechanism on the receiving node to atomically obtain a lock on a predefined memory location and write an identifier of the source node into the predefined memory location on the receiving node.

* * * * *